(12) United States Patent  (10) Patent No.: US 8,666,897 B2
Mears                     (45) Date of Patent:    Mar. 4, 2014

(54) SYSTEM AND METHOD FOR PROVIDING A FINANCIAL TRANSACTION INSTRUMENT WITH USER-DEFINABLE AUTHORIZATION CRITERIA

(71) Applicant: American Express Travel Related Services Company, Inc., New York, NY (US)

(72) Inventor: Stuart Andrew Mears, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 13/645,156

(22) Filed: Oct. 4, 2012

(65)  Prior Publication Data

US 2013/0036055 A1    Feb. 7, 2013

Related U.S. Application Data

(63) Continuation of application No. 11/255,306, filed on Oct. 20, 2005, now Pat. No. 8,301,566.

(51) Int. Cl.
*G06Q 40/00*    (2012.01)
(52) U.S. Cl.
USPC ............... 705/44; 705/39; 705/40; 705/10; 705/64; 704/275; 726/4; 235/380
(58) Field of Classification Search
USPC ......... 705/10, 44, 39–40, 64; 704/275; 726/4; 235/380
See application file for complete search history.

(56)  References Cited

U.S. PATENT DOCUMENTS

| 4,910,672 A | 3/1990 | Off et al. |
| 4,941,090 A | 7/1990 | McCarthy |
| 5,025,372 A | 6/1991 | Burton et al. |
| 5,056,019 A | 10/1991 | Schultz et al. |
| 5,117,355 A | 5/1992 | McCarthy |
| 5,128,752 A | 7/1992 | Von Kohorn |
| 5,173,851 A | 12/1992 | Off et al. |

(Continued)

FOREIGN PATENT DOCUMENTS

| EP | 0308224 A2 | 3/1989 |
| WO | 0033159 A2 | 6/2000 |
| WO | 0033222 A1 | 6/2000 |

OTHER PUBLICATIONS

Pthreads Programming; O'Reilly & Associates, Inc. 1996.

(Continued)

*Primary Examiner* — Harish T Dass
(74) *Attorney, Agent, or Firm* — Snell & Wilmer L.L.P.

(57)  ABSTRACT

Authorization limits on the use of a financial transaction instrument, such as a credit card and the like, may be set by an owner of a financial account corresponding to the financial transaction instrument. The owner provides information identifying the owner, the financial account, and the financial transaction instrument corresponding to the financial account to a computer, and also provides an owner-defined authorization limit on use of the financial transaction instrument to the computer. The authorization limit is stored in a database, which is accessed when there is a request to authorize a purchase to be made with the financial transaction instrument. The owner may communicate with the computer via a Web site, an automated call program, a kiosk, or the like.

17 Claims, 7 Drawing Sheets

(56) References Cited

U.S. PATENT DOCUMENTS

| | | |
|---|---|---|
| 5,200,889 A | 4/1993 | Mori |
| 5,201,010 A | 4/1993 | Deaton et al. |
| 5,202,826 A | 4/1993 | McCarthy |
| 5,233,514 A | 8/1993 | Ayyoubi et al. |
| 5,237,620 A | 8/1993 | Deaton et al. |
| 5,287,268 A | 2/1994 | McCarthy |
| 5,305,196 A | 4/1994 | Deaton et al. |
| 5,327,508 A | 7/1994 | Deaton et al. |
| 5,388,165 A | 2/1995 | Deaton et al. |
| 5,430,644 A | 7/1995 | Deaton et al. |
| 5,448,471 A | 9/1995 | Deaton et al. |
| 5,467,269 A | 11/1995 | Flaten |
| 5,483,444 A | 1/1996 | Heintzeman et al. |
| 5,491,326 A | 2/1996 | Marceau et al. |
| 5,513,102 A | 4/1996 | Auriemma |
| 5,537,314 A | 7/1996 | Kanter |
| 5,592,560 A | 1/1997 | Deaton et al. |
| 5,612,868 A | 3/1997 | Off et al. |
| 5,621,812 A | 4/1997 | Deaton et al. |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |
| 5,675,662 A | 10/1997 | Deaton et al. |
| 5,687,322 A | 11/1997 | Deaton et al. |
| 5,689,100 A | 11/1997 | Carrithers et al. |
| 5,734,838 A | 3/1998 | Robinson et al. |
| 5,742,845 A | 4/1998 | Wagner |
| 5,774,870 A | 6/1998 | Storey |
| 5,806,045 A | 9/1998 | Biorge et al. |
| 5,832,457 A | 11/1998 | O'Brien et al. |
| 5,864,822 A | 1/1999 | Baker, III |
| RE36,116 E | 2/1999 | McCarthy |
| 5,892,827 A | 4/1999 | Beach et al. |
| 5,898,838 A | 4/1999 | Wagner |
| 5,905,908 A | 5/1999 | Wagner |
| 5,907,831 A | 5/1999 | Lotvin et al. |
| 5,915,007 A | 6/1999 | Klapka |
| 5,915,244 A | 6/1999 | Jack et al. |
| 5,923,016 A | 7/1999 | Fredregill et al. |
| 5,937,391 A | 8/1999 | Ikeda et al. |
| 5,953,710 A | 9/1999 | Fleming |
| 5,956,695 A | 9/1999 | Carrithers et al. |
| 5,970,469 A | 10/1999 | Scroggie et al. |
| 5,983,196 A | 11/1999 | Wendkos |
| 5,983,205 A | 11/1999 | Brams et al. |
| 5,991,376 A | 11/1999 | Hennessy et al. |
| 5,991,736 A | 11/1999 | Ferguson et al. |
| 5,992,738 A | 11/1999 | Matsumoto et al. |
| 5,999,914 A | 12/1999 | Blinn et al. |
| 6,000,608 A | 12/1999 | Dorf |
| 6,009,411 A | 12/1999 | Kepecs |
| 6,009,412 A | 12/1999 | Storey |
| 6,012,039 A | 1/2000 | Hoffman et al. |
| 6,012,051 A | 1/2000 | Sammon, Jr. et al. |
| 6,014,634 A | 1/2000 | Scroggie et al. |
| 6,014,635 A | 1/2000 | Harris et al. |
| 6,018,718 A | 1/2000 | Walker et al. |
| 6,026,370 A | 2/2000 | Jermyn |
| 6,032,136 A | 2/2000 | Brake, Jr. et al. |
| 6,035,280 A | 3/2000 | Christensen |
| 6,039,244 A | 3/2000 | Finsterwald |
| 6,041,309 A | 3/2000 | Laor |
| 6,047,270 A | 4/2000 | Joao et al. |
| 6,049,778 A | 4/2000 | Walker et al. |
| 6,049,779 A | 4/2000 | Berkson |
| 6,055,573 A | 4/2000 | Gardenswartz et al. |
| 6,058,371 A | 5/2000 | Djian |
| 6,061,660 A | 5/2000 | Eggleston et al. |
| 6,076,101 A | 6/2000 | Kamakura et al. |
| 6,101,484 A | 8/2000 | Halbert et al. |
| 6,101,485 A | 8/2000 | Fortenberry et al. |
| 6,105,001 A | 8/2000 | Masi et al. |
| 6,128,599 A | 10/2000 | Walker et al. |
| 6,129,274 A | 10/2000 | Suzuki |
| 6,134,318 A | 10/2000 | O'Neil |
| 6,138,911 A | 10/2000 | Fredregill et al. |
| 6,161,096 A | 12/2000 | Bell |
| 6,164,533 A | 12/2000 | Barton |
| 6,173,267 B1 | 1/2001 | Cairns |
| 6,178,407 B1 | 1/2001 | Lotvin et al. |
| 6,178,408 B1 | 1/2001 | Copple et al. |
| 6,185,541 B1 | 2/2001 | Scroggie et al. |
| 6,196,458 B1 | 3/2001 | Walker et al. |
| 6,216,129 B1 | 4/2001 | Eldering |
| 6,243,688 B1 | 6/2001 | Kalina |
| 6,249,772 B1 | 6/2001 | Walker et al. |
| 6,251,017 B1 | 6/2001 | Leason et al. |
| 6,267,672 B1 | 7/2001 | Vance |
| 6,324,525 B1 | 11/2001 | Kramer et al. |
| 6,330,544 B1 | 12/2001 | Walker et al. |
| 6,332,126 B1 | 12/2001 | Peirce et al. |
| 6,334,111 B1 | 12/2001 | Carrott |
| 6,336,098 B1 | 1/2002 | Fortenberry et al. |
| 6,386,444 B1 | 5/2002 | Sullivan |
| 6,450,407 B1 | 9/2002 | Freeman et al. |
| 6,532,448 B1 | 3/2003 | Higginson et al. |
| 6,594,640 B1 | 7/2003 | Postrel |
| 6,601,759 B2 | 8/2003 | Fife et al. |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,931,382 B2 | 8/2005 | Laage et al. |
| 2001/0032137 A1 | 10/2001 | Bennett et al. |
| 2001/0047336 A1 | 11/2001 | Maycock et al. |
| 2002/0013728 A1 | 1/2002 | Wilkman |
| 2002/0062253 A1 | 5/2002 | Dosh, Jr. et al. |
| 2002/0069150 A1 | 6/2002 | Ni |
| 2002/0082918 A1 | 6/2002 | Warwick |
| 2002/0082920 A1 | 6/2002 | Austin et al. |
| 2002/0143626 A1 | 10/2002 | Voltmer et al. |
| 2002/0152116 A1 | 10/2002 | Yan et al. |
| 2003/0061097 A1 | 3/2003 | Walker et al. |
| 2003/0083985 A1 | 5/2003 | Chen et al. |
| 2003/0208439 A1 | 11/2003 | Rast |
| 2003/0229584 A1 | 12/2003 | Brown |
| 2003/0236712 A1 | 12/2003 | Antonucci et al. |
| 2004/0019522 A1 | 1/2004 | Bortolin et al. |
| 2004/0030657 A1 | 2/2004 | Holm-Blagg et al. |
| 2004/0064406 A1* | 4/2004 | Yates et al. ............ 705/40 |
| 2004/0068438 A1 | 4/2004 | Mitchell et al. |
| 2004/0128197 A1 | 7/2004 | Bam et al. |
| 2004/0215505 A1 | 10/2004 | Sullivan |
| 2004/0262381 A1 | 12/2004 | Mesaros |
| 2005/0038695 A1* | 2/2005 | Matsko ............ 705/10 |
| 2005/0209962 A1* | 9/2005 | Hogan ............ 705/39 |

OTHER PUBLICATIONS

Credit Card Mini-Lesson, Dale Carnegie & Associates, Inc., 1996.
USPTO; Office Action dated Apr. 1, 2008 in U.S. Appl. No. 11/255,306.
USPTO; Final Office Action dated Oct. 22, 2008 in U.S. Appl. No. 11/255,306.
USPTO; Advisory Action dated Mar. 19, 2009 in U.S. Appl. No. 11/255,306.
USPTO; Office Action dated Jul. 8, 2009 in U.S. Appl. No. 11/255,306.
USPTO; Office Action dated Dec. 3, 2009 in U.S. Appl. No. 11/255,306.
USPTO; Final Office Action dated Jun. 9, 2010 in U.S. Appl. No. 11/255,306.
USPTO; Advisory Action dated Aug. 13, 2010 in U.S. Appl. No. 11/255,306.
USPTO; Office Action dated Nov. 5, 2010 in U.S. Appl. No. 11/255,306.
USPTO; Final Office Action dated Apr. 15, 2011 in U.S. Appl. No. 11/255,306.
USPTO; Advisory Action dated Jun. 22, 2011 in U.S. Appl. No. 11/255,306.

(56) References Cited

OTHER PUBLICATIONS

USPTO; Office Action dated Aug. 26, 2011 in U.S. Appl. No. 11/255,306.
USPTO; Final Office Action dated Dec. 29, 2011 in U.S. Appl. No. 11/255,306.
USPTO; Advisory Action dated Mar. 9, 2012 in U.S. Appl. No. 11/255,306.
USPTO; Notice of Allowance dated Jul. 31, 2012 in U.S. Appl. No. 11/255,306.

* cited by examiner

SYSTEM AND METHOD FOR PROVIDING A FINANCIAL TRANSACTION INSTRUMENT WITH USER-DEFINABLE AUTHORIZATION CRITERIA

CROSS-REFERENCE TO RELATED APPLICATIONS

This application is a continuation of, claims priority to and the benefit of, U.S. Ser. No. 11/255,306 filed Oct. 20, 2005 and entitled "SYSTEM AND METHOD FOR PROVIDING A FINANCIAL TRANSACTION INSTRUMENT WITH USER-DEFINABLE AUTHORIZATION CRITERIA," which is incorporated herein by reference in its entirety.

FIELD OF INVENTION

The present invention generally relates to a system and a method for providing a financial transaction account with selectively variable criteria for authorizing financial transactions. More particularly, the present invention relates to a system and a method for enabling an owner of a financial transaction account to define an authorization limit on use of a financial transaction instrument associated with the financial transaction account.

RELATED ART

Consumers very often use financial transaction instruments as convenient forms of payment for purchases of goods and/or services ("goods/services"). A "financial transaction instrument," also referred to herein as a "card," may be any of the following: a traditional "plastic" transaction card (e.g., a credit card, a charge card, a debit card, a pre-paid or stored-value card, or the like); a titanium-containing, or other metal-containing, transaction card; a clear or translucent transaction card; a foldable or otherwise unconventionally-sized transaction card; a radio-frequency-enabled transaction card; or any other type of card used in connection with a financial transaction.

A financial transaction instrument may be configured with electronic functionality. For example, such an instrument can have electronic circuitry that is printed or otherwise incorporated onto or within it (commonly being referred to as a "smart card"), or may be a fob-type device having a transponder and a radio-frequency identification ("RFID") reader. Additionally, a financial transaction instrument may be magnetically encoded with information, such as through use of a magnetic stripe, for example. Optionally, a financial transaction instrument may include a visible card identification number ("CID") uniquely identifying a corresponding financial transaction account, in case the instrument cannot easily be read electronically or magnetically.

A "financial transaction account," also referred to herein as a "transaction account," is an account associated with an open-account system or a closed-account system, which are discussed in more detail below. A transaction account may exist in a physical or a non-physical embodiment. For example, a transaction account may be distributed in a non-physical embodiment such as an account number, a frequent-flyer account, a telephone calling account, or the like. Furthermore, a physical embodiment of a transaction account may be distributed as a financial transaction instrument.

"Open cards" are financial transaction instruments associated with an open-account system and generally are accepted by different merchants. Examples of open cards include the American Express®, Visa®, MasterCard® and Discover® cards, which may be used at many different retailers and other businesses. In contrast, "closed cards" are financial transaction instruments associated with a closed-account system and may be restricted to use in a particular store, a particular chain of stores, or a collection of affiliated stores. One example of a closed card is a pre-paid gift card for The Gap®, which typically is purchased at and may only be accepted at The Gap® stores.

Stored-value cards are financial transaction instruments that may be associated with a closed-account system or an open-account system. A stored-value card provides a cash equivalent value that may be used within an existing payment/transaction infrastructure. Stored value cards are frequently referred to as gift, pre-paid, or cash cards, in that money is deposited in an account associated with a stored-value card before use of the card is allowed. For instance, if ten dollars are deposited into the account associated with the stored-value card, then that card may only be used for payments adding up to a total of no more than ten dollars. A pre-paid gift card for a particular merchant is an example of a type of stored-value card associated with a closed-account system (i.e., the card generally can only be used with that particular merchant); and a cash card obtained from an issuer is an example of a type of stored value card associated with an open-account system (i.e., the card generally can be used wherever the issuer's type of card is accepted).

As used herein, the term "merchant" refers to any person, entity, distributor system, software, and/or hardware that is a provider or broker of goods/services, and includes any other entity in the distribution chain of goods/services. For example, a merchant may be a grocery store, a retail store, a travel agency, a service provider, a public-service utility, a school, a library, an on-line merchant, a government agency, or the like.

Also, as used herein, the terms "consumers," "customers," and "users" may be used interchangeably to refer to persons who purchase goods/services from merchants.

In regard to use of a financial transaction account, a customer may communicate or interact with a merchant in person (e.g., at a box office), telephonically, or electronically (e.g., from a computer via the Internet). During the interaction, the merchant may offer good/services to the customer. The merchant also may offer the customer an option to pay for the goods/services using any number of available transaction accounts via their corresponding cards. Furthermore, the cards may be used by the merchant as a form of identification of the customer.

Generally, a merchant that wants to provide customers with the option to pay for goods/services with a particular type of open card will enter into an agreement with the issuer of that type of card (e.g., American Express®, Visa®, Discover®, MasterCard®, or the like). The issuer typically is a financial organization (e.g., American Express®, JPMorgan Chase, MBNA®, Citibank®, or the like) whose cud-issuing activities are government regulated.

Cards provide consumers with a convenient way to pay for purchases, and also provide merchants with a convenient way to obtain payment for purchases. Because of the wide use of cards by consumers, the types and number of merchants that accept cards has grown and now, in addition to the more traditional merchants such as stores and restaurants, include taxi drivers, doctors, schools, street vendors, on-line vendors, and government agencies, to name a few. Further, through the use of point-of-sale ("POS") devices, merchants can easily request authorization from issuers for purchases for which cards are presented for payment, and obtain prompt payment for purchases.

As will be appreciated by those of skill in the relevant art(s), transactions in which cards are presented to merchants to pay for purchases may occur through any suitable communication medium, such as, for example, a PSTN, an intranet, a global and public network (e.g., the Internet), in addition to the traditional face-to-face transactions, and may occur using any type of point-of-interaction device (e.g., a POS device, a personal digital assistant ("PDA"), a cellular telephone, a kiosk, etc.) that enables communication of such transactions. Communications may occur online or off-line and may be wired or wireless.

As used herein, a "POS device" refers to any electronic device used by a merchant to input information regarding a purchase as well as other information, such as information regarding the merchant, information for identifying a financial transaction account from which payment for the purchase is to be obtained, etc. For example, the input information may include a dollar amount of the purchase and identification information electronically and/or magnetically read from a card used to make the purchase. Optionally, the identification information may be manually input at the POS device based on a visible CID. The purchase information and the identification information are transmitted to the issuer's computer system, which identifies the transaction account and makes a determination of whether the purchase is approved or rejected based on account information regarding the transaction account. The issuer's computer system then transmits a message back to the POS device regarding the purchase. Examples of messages sent between the POS device and the issuer's computer system include: a request for authorization; an authorization approval or rejection; an instruction to obtain additional identification to verify the identity of the person presenting the card; a message indicating that the financial transaction account has reached a maximum aggregate dollar amount; etc.

Issuers have a financial incentive to contract with as many merchants as possible to accept their cards. Typically, an issuer is paid a so-called "discount rate" by each merchant signed up to accept payment using the issuer's type of card. The discount rate may be, for example, a flat rate paid periodically or a rate based on the merchant's net sales that are paid for using the issuer's type of card.

In order to convince merchants to accept its card, an issuer may provide the merchants with information showing that a large number of consumers hold its card and that a significant percentage of purchases made using a card have been made using the issuer's type of card. Further, the issuer may provide the merchants with information on incentive programs used to promote consumer loyalty to its type of card.

A number of types of incentive programs are in use today. One type is commonly referred to as a "reward program" and often is associated with a closed-account system. Such a program rewards customers for purchases made from a particular merchant by providing the customers with reward points based on, for example, a predetermined formula or ratio that relates a customer's purchase volume (e.g., dollar-amount spent and/or quantity purchased, etc.) to a certain number of reward points. The reward points may be accumulated and redeemed in a plurality of ways, including exchanging the reward points for additional goods/services from the merchant or for goods/services that may be selected from an approved redemption catalog, for example.

One well-known example of such as reward program is a "frequent flyer" program, which rewards customers of an airline with "mileage points" based upon, for example, the distances that the customers fly with that airline. The mileage points accumulated by the customers may be redeemed for free airfare, free travel-class upgrades, free car rentals and/or the like.

Another well-known example of a reward program associated with an open-account system is one that promotes or induces usage of a particular type of card, by distributing reward points or dollar-value points based upon the volume of purchases (e.g., total number of purchases and/or total cost of purchases, etc.) made using the card. This type of program may be designed such that a financial transaction account corresponding to the card accumulates reward points that may be redeemed for selected goods/services, or, alternatively, accumulates points that have a dollar value, which may be applied toward a balance of the transaction account. An example of the latter program is the Discover® Cashback Bonus® program.

Conventional incentive programs, such as those described above, generally are aimed at increasing the usage of cards but have a limited effect on increasing the number of cards in circulation. That is, conventional incentive programs enable an issuer (or a merchant) to increase the number of purchases and/or the dollar amount of purchases made using the issuer's (or merchant's) type of card, but do not significantly affect the number of consumers who hold the issuer's (or merchant's) type of card.

Given the foregoing, a need exists for an incentive program that allows an issuer (or a merchant) to increase the number of its type of cards in circulation.

BACKGROUND OF THE INVENTION

The present invention meets the above-identified need by providing a system, a method, and a computer program product that allows an owner or holder of a financial transaction account ("account holder") to set use limits on a base card associated with the transaction account as well as to obtain supplemental cards associated with the transaction account, in which the supplemental cards have use limits set by the account holder. The use limits are referred to herein as "holder-defined limits." Whereas conventional supplemental cards typically have the same purchasing limits as their corresponding base card, the present invention enables an account holder to define or set limits on the base card and separately set limits on each supplemental card associated with the account holder's transaction account.

An advantage of the present invention is that it allows the account holder, who may have been hesitant to give a supplemental card to another user for fear that the supplemental card will be used for inappropriate purchases by the other user, to have the comfort of knowing that the supplemental card may only be used to pay for purchases within the limits set by the account holder. This has the beneficial effect of increasing the number of cards in circulation, by providing a measure of security for account holders to give supplemental cards to, for example, children, spouses, domestic employees, etc., some of whom otherwise would not have been able to obtain cards on their own. More specifically, an issuer that provides its account holders with the flexibility to obtain supplemental cards with holder-defined limits is likely to increase the number of its type of card in circulation compared with an issuer that does not provide such flexibility.

Another advantage of the present invention is that it enables self-imposed limits to be set by account holders on their own base cards. This serves to reduce the risk of for example, impulsive purchases on high-priced items, etc.

A further advantage of the present invention is that it allows a merchant to promote corporate usage of its type of card, by enabling corporations to set customized limits for employees to whom corporate cards are issued. For instance, for each supplemental card, limits may be set on travel expenses, travel destinations, and/or the like.

According to the present invention, a system, a method, and a computer program product is provided for enabling an owner of a financial account to set authorization limits on use of a financial transaction instrument corresponding to the financial account. A computer receives information identifying the owner, the financial account, and the financial transaction instrument corresponding to the financial account, and also receives an owner-defined authorization limit on use of the financial transaction instrument. The authorization limit is stored in a database, which is accessed when there is a request to authorize a purchase to be made with the financial transaction instrument.

The owner of the financial account may communicate with the computer via a Web site, an automated call program, a kiosk, or the like to modify an authorization limit on use of an existing financial transaction instrument or to set an authorization limit on use of a newly requested financial transaction instrument.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION

I. Overview

The present invention is directed to a system, a method, and a computer program product for enabling an account holder, i.e., an owner of a financial transaction account, to define or set limits within which a financial transaction instrument corresponding to the financial transaction account may be used to pay for purchases. The holder-defined limits are used by the issuer of the financial transaction instrument to determine whether to authorize a purchase to be made with the financial transaction instrument.

II. System

Figure 1:
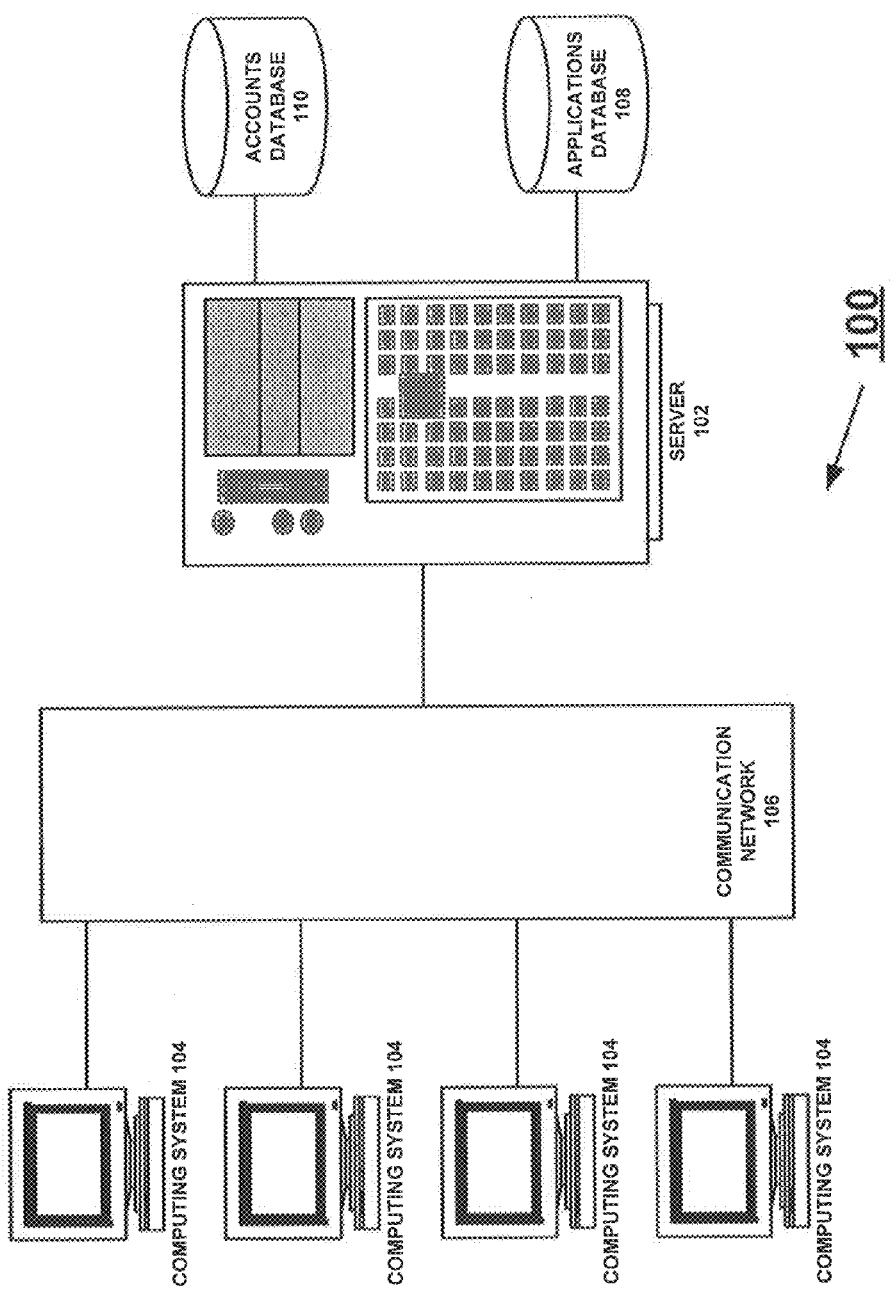
FIG. 1 schematically illustrates a system diagram of an exemplary limit-setting system used to implement an embodiment of the present invention.

FIG. 1 shows a schematic system diagram of an exemplary limit-setting system 100, used to implement or practice one or more embodiments of the present invention. System 100 includes a server 102 interconnected with one or more computing systems 104 via a communication network 106. Server 102 has access to a plurality of databases in/from which information is stored/retrieved, such as an applications database 108 and an accounts database 110, for example. Applications database 108 stores information on applications for new financial transactions accounts, and accounts database 110 stores information on existing transaction accounts. Communication network 106 may be the Internet, a public switched telephone network (PSTN), or any other means of communication between server 102 and computing system(s) 104, whether wired or wireless. Computing system 104 may be used by an account holder or an applicant to communicate with the issuer, and may be a personal computer, a workstation, a mainframe computer, a kiosk, a personal digital assistant, or any other digital device able to perform data communication with server 102.

Optionally, to ensure security, communications may occur indirectly with server 102 through a security filter (not shown) such as, for example, a firewall, which may be implemented with hardware, software, or a combination thereof. Other types of security measures may be employed, as will be appreciated by persons of skill in the relevant art(s).

Figure 2:
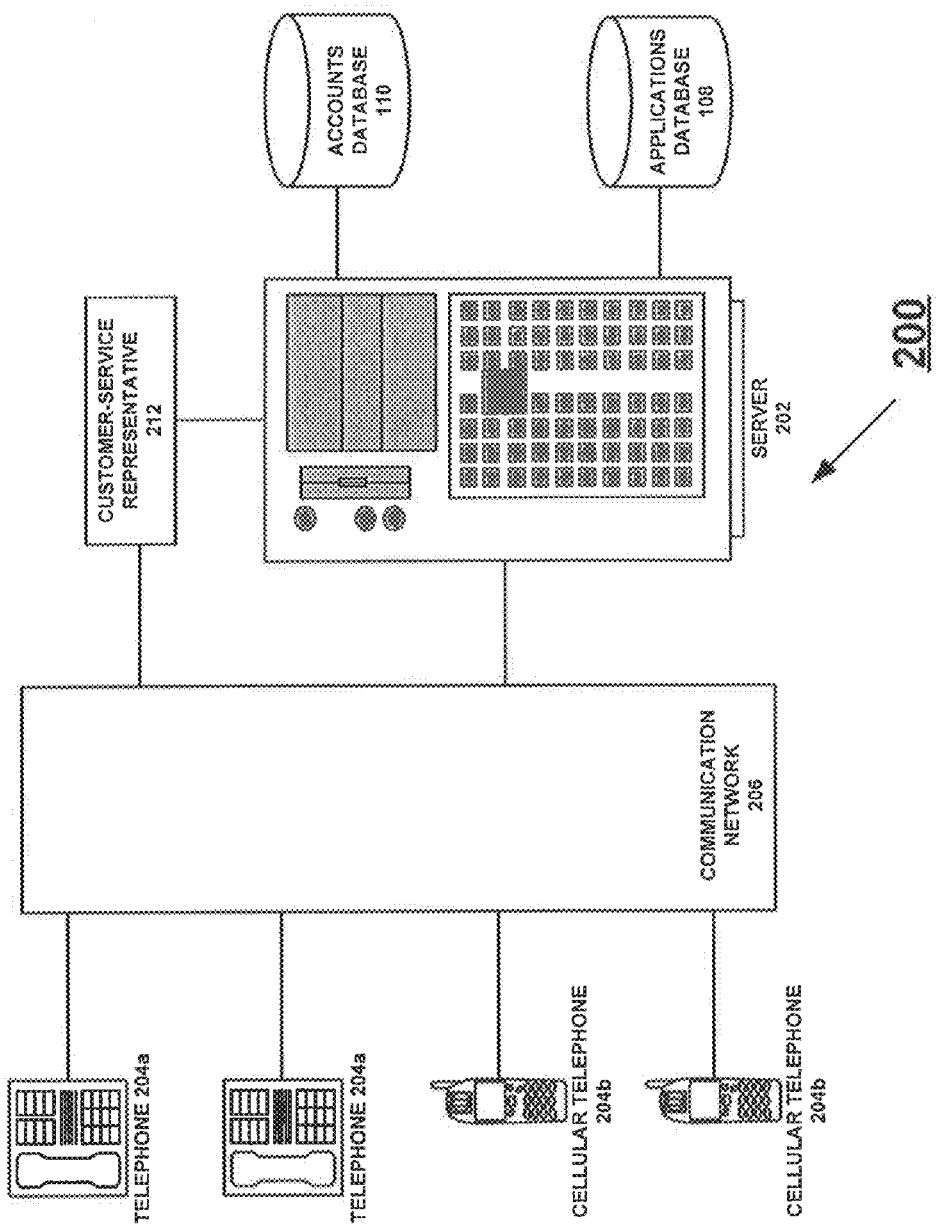
FIG. 2 schematically illustrates a system diagram of another exemplary limit-setting system used to implement an embodiment of the present invention.

FIG. 2 shows a schematic system diagram of another exemplary limit-setting system 200, used to implement or practice one or more embodiments of the present invention. System 200 includes a server 202 interconnected with one or more telephone systems 204a, 204b via a communication network 206. Server 202 has access to a plurality of databases in/from which information is stored/retrieved, such as applications database 108 and accounts database 110. Although not shown in FIG. 2, the server includes a dual-tone multi-frequency ("DTMF") processing device for detecting DTMF signals or tones and determining the frequency of a detected tone. Communication network 206 may be the Internet, a PSTN, or any other means of communication between server 202 and telephone system(s) 204a, 204b, whether wired or wireless. Telephone systems 204a, 204b may be used by account holders or applicants to communicate with the issuer, and may be a cellular telephone, a landline telephone, or any other telephonic device able to communicate dual-tone multi-frequency ("DTMF") signals, commonly referred to as "touch-tone" signals, with server 202.

As an alternative option, an account holder or an applicant may communicate with the issuer via a rotary or dial-pulse telephone (not shown). In this case, communication network 206 is a PSTN, and a live customer-service representative 212 receives authorization-limit instructions from the account holder or the applicant and inputs the instructions to server 202. Of course, even when a DTMF-capable telephone is used, communication with the issuer may proceed through customer-service representative 212.

Figure 3:
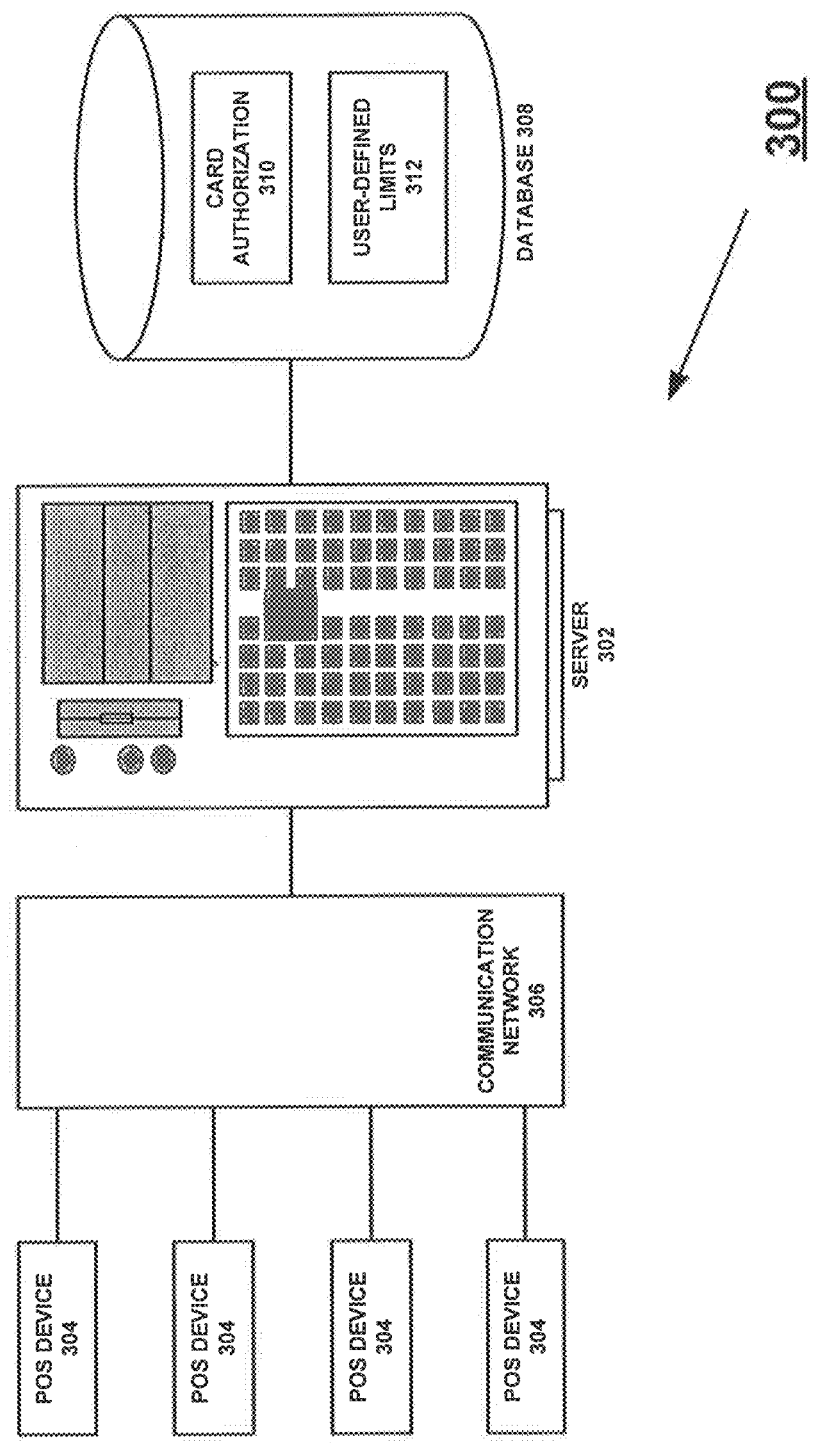
FIG. 3 schematically illustrates a system diagram of an exemplary authorization system used to implement an embodiment of the present invention.

FIG. 3 shows a schematic system diagram of an exemplary authorization system 300 used to implement or practice one or more embodiments of the present invention. System 300 includes a server 302 interconnected with one or more POS devices 304 via a communication network 306. Server 302 has access to a database 308 with a plurality of regions in/from which information is stored/retrieved. For example, database 308 may include a region 310 for storing card-authorization information and a region 312 for storing user-defined authorization limits, and optionally may incorporate accounts database 110 (not shown in FIG. 3). Communication network 306 may be the Internet, a PSTN, or any other means of communication between server 302 and POS device(s) 304, whether wired or wireless.

Optionally, security measures may be employed in authorization system 300. Also, as will be appreciated by persons of skill in the relevant art(s), regions 310, 312 need not be separate regions within database 308. Instead, the card-authorization information and the user-defined authorization limits stored in regions 310, 312 may be combined and stored in a single region of database 308.

III. Process

Figure 4:
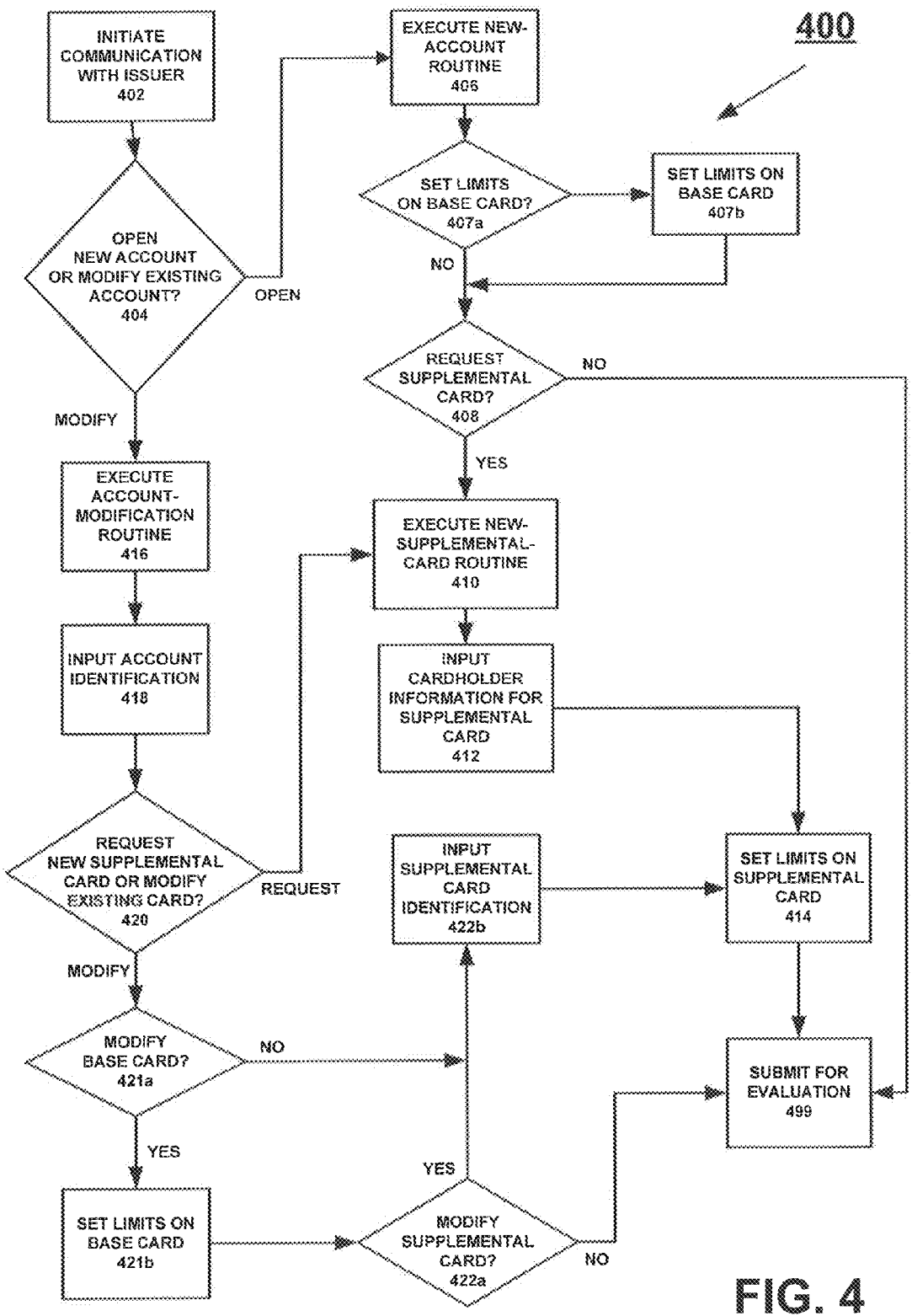
FIG. 4 shows a flowchart illustrating an exemplary authorization-limit definition process, according to an embodiment of the present invention.

Referring to FIG. 4, a flowchart illustrating an authorization-limit definition process 400, according to an embodiment of the present invention, is shown. Preferably, process 400 utilizes limit-setting system 100. As discussed above, optional security measures (e.g., firewall, etc.) may be implemented prior to and/or concurrently with communication with server 102. Although process 400 is described below in terms of open cards obtained from issuers, process 400 also is applicable to other types of cards, including those issued by merchants (e.g., closed cards), as well as other types of financial transaction instruments.

Process 400 begins at step 402, at which a user (i.e., a holder of an existing account or a new applicant) initiates communication with the issuer by using computing system 104 to access server 102 via communication network 106. Preferably, communication network 106 is the Internet, and computing system 104 accesses the issuer's Web site, which is an interactive computer program executed by server 102. The Web site includes, among other things, Web pages for a holder to view account details regarding an existing financial transaction account, including details regarding a base card and supplemental cards (if any) corresponding to the existing transaction account; to modify authorization limits on the base card and/or an existing supplemental card; and to obtain and set authorization limits on a new supplemental card. The Web site also includes Web pages for a new applicant to apply to open a new financial transaction account with the issuer and to obtain a base card and, if desired, one or more supplemental cards. The design and implementation of a Web site with interactive Web pages may be done using techniques that are well known and well established, and therefore will not be described in detail herein. As will be appreciated by persons of skill in the relevant art(s), the user may interact with the Web site by clicking on or choosing appropriate options displayed on a Web page or by inputting replies in response to queries or prompts displayed on a Web page.

A financial transaction account may be arranged to correspond to a base card and one or more supplemental cards, or may be arranged to correspond to a base card and link to one or more supplemental accounts corresponding to one or more supplemental cards. For the purposes of the present discussion, a supplemental card and/or a supplemental account is subordinate to its corresponding transaction account.

At step 404, the Web site prompts the user to input information regarding whether the user is applying to open a new financial transaction account or is modifying an existing transaction account. If the user inputs information indicating that a new financial transaction account is being applied for, at step 406, server 102 executes a new-account software module or routine for acquiring information necessary for a new transaction account and a corresponding new base card. After the necessary information has been input by the user, the Web site then, at step 407a, prompts the user to indicate whether limits are to be set on the base card. If no base-card limits are to be set, process 400 proceeds to step 408. If limits are to be set on the base card, at step 407b, a limit-setting procedure takes place, as discussed below.

At step 408, the Web site requests the user to input information regarding whether a new supplemental card is desired. If the answer is no, at step 499, server 102 submits the application for evaluation. If the answer is, yes, process 400 proceeds to step 410.

At step 410, server 102 executes a software routine for acquiring information necessary for a new supplemental card. As discussed above, a supplemental card may be associated with its own supplemental account, which is linked to the financial transaction account to be opened, or may be associated directly with the transaction account to be opened. Either way, the user will have control over the supplemental card. At step 412, the Web site prompts the user for information regarding who the supplemental card is for, including information such as name, address, date of birth, and relationship to the user, for example. Then, at step 414, the limit-setting procedure takes place. After the user provides all the information requested by the Web site, process 400 proceeds to step 499, at which point server 102 submits the application for evaluation.

In the limit-setting procedure, the Web site provides the user with choices for limiting how a card (base or supplemental) may be used for purchases, and the user makes one or more selections from the choices. For example, the Web site may provide drop-down menus from which the user selects a maximum amount per purchase charged to the card; a maximum amount per month charged to the card; one or more types of forbidden merchants (e.g., casinos, so-called "1-900 number" telephonic service merchants, bars, etc.); and/or one or more types of forbidden goods/services (e.g., cash advances, plane tickets, jewelry, alcohol, etc.). As will be appreciated by those of skill in the relevant art(s), other types of limitations on the use of the card may be selected by the user through interaction with the Web site.

Optionally, the Web site may provide the user with a menu from which approved uses of the card may be selected, such that the card may not be used on purchases other than those that fall within the approved uses. For example, if the card is a supplemental card to be issued to a college-bound student, the user may use the Web site to indicate that the supplemental card may only be used at supermarkets, restaurants, book stores, and movie theaters; if the card is a supplemental card to be issued to a corporate employee of the user, the user may use the Web site to indicate that the supplemental card may only be used for transportation, hotels, and restaurants, and to indicate a dollar-amount limit on purchases made from those types of merchants.

At step 404, if the user inputs information indicating that an existing financial transaction account is to be modified, then server 102 executes an account-modification software module, at step 416. At step 418, server 102 acquires from the user, via the Web site, information necessary to identify the existing transaction account. The user also interacts with the Web site, at step 420, to input information indicating whether he is applying for a new supplemental card or modifying the account details of an existing supplemental card or the base card.

If the user indicates that he is applying for a new supplemental card, process 400 proceeds to step 410, discussed above. If the user indicates that he is modifying the account details of an existing card, the Web site prompts the user to indicate whether the base card is to be modified, at step 421*a*. If the base card is to modified, at step 421*b*, the limit-setting procedure takes place. At step 422*a*, the Web site prompts the user to indicate whether the account details of a supplemental card are to be modified. If no, process 400 proceeds to step 499, at which point server 102 submits the application for evaluation. If yes, at step 422*b*, the Web site prompts the user for information necessary to identify the supplemental card for which the account details are to be modified. After the user provides the necessary information, process 400 proceeds to step 414, discussed above.

Server 102 stores application information obtained via the Web site in applications database 108, which is accessible by the issuer's application processing agents. Once an application for a financial transaction account is approved, the account information, which may include information on all supplemental cards associated with the financial transaction account, is stored in accounts database 110.

In an embodiment of the present invention in which limit-setting system 200 is used, an authorization-limit definition process 500 proceeds as described below, with reference to the flowchart shown in FIG. 5.

Process 500 begins at step 502, at which a user (i.e., a holder of an existing account or a new applicant) initiates communication with the issuer by using DTMF-capable telephone 204*a* or 204*b* to access server 202 via communication network 206. Preferably, communication network 206 is a PSTN, and telephone 204*a* or 204*b* accesses the issuer's call system, which is an interactive automated call program executed by server 202 when a predetermined telephone number is called.

The automated call program has a plurality of sets of pre-recorded menu options, which the user hears through a handset or speaker of telephone 204*a* or 204*b*. When a set of pre-recorded menu options is presented to the user, the user selects an option by pushing a corresponding telephone button identified in the recording, which sends a specific tone signal to server 202 to indicate the user's selection. When server 202 receives a tone signal from the user in response to a request to select a menu option, server 202 registers the user's response based on the frequency of the tone and proceeds to a set of pre-recorded menu options in accordance with the response.

The automated call program includes one or more sets of pre-recorded menu options that may be used by an account holder to bear account details regarding an existing financial transaction account, including details regarding a base card and supplemental cards (if any) corresponding to the existing transaction account; to modify authorization limits on the base card and/or an existing supplemental card; and to obtain and set authorization limits on a new supplemental card. The call program also includes one or more sets of pre-recorded menu options that may be used by an applicant to apply to open a new financial transaction account with the issuer and to obtain a base card and, if desired, one or more supplemental cards. The design and implementation of an interactive call program may be done using techniques that are well known and well established, and therefore will not be described in detail herein. As will be appreciated by persons of skill in the relevant art(s), the user may interact with the call program by pressing a telephone button corresponding to a selected menu option, or by pressing a sequence of buttons on an alphanumeric keypad on telephone 204*a* or 204*b*.

Process 500 relates to setting holder-defined limits on a supplemental card. A person of skill in the relevant art(s) will appreciate, however, that process 500 may be modified to set holder defined limits on the base card and/or a supplemental card, similar to process 400.

At step 504, the automated call program prompts the user to input information regarding whether the user is applying to open a new financial transaction account or modifying an existing financial transaction account. If the user inputs information indicating that a new financial transaction account is being applied for, at step 506, server 202 executes a new-account software module or routine for acquiring information necessary for a new financial transaction account and a corresponding new base card. After the necessary information has been input by the user, the automated call program then, at step 508, requests the user to input information regarding whether a new supplemental card is desired. If the answer is no, at step 599, server 202 submits the application for evaluation. If the answer is yes, process 500 proceeds to step 510.

At step 510, server 202 executes a software routine for acquiring information necessary for a new supplemental card. At step 512, the automated call program prompts the user for information regarding who the supplemental card is for, including information such as name, address, date of birth, and relationship to the user, for example. Then, at step 514, the call program provides the user with a set of menu options for limiting the use of the supplemental card. After the user provides all the information requested by the call program and has indicated that he wishes to proceed with the application, process 500 proceeds to step 599, at which point server 202 submits the application for evaluation.

At step 504, if the user inputs information indicating that an existing financial transaction account is to be modified, then server 502 executes an account-modification software module, at step 516. At step 518, server 202 acquires, via the automated call program, information necessary to identify the existing transaction account. The user also interacts with the call program, at step 520, to input information indicating whether he is applying for a new supplemental card or modifying the details of an existing supplemental card.

If the user indicates that he is applying for a new supplemental card, process 500 proceeds to step 510, discussed above. If the user indicates that he is modifying account details relating to an existing supplemental card, process 500 proceeds to step 522, at which point the automated call program prompts the user for information necessary to identify the existing supplemental card for which the account details are to be modified. After the user provides the necessary information, process 500 proceeds to step 514, discussed above.

Server 202 submits an application for evaluation by storing application information obtained via the automated call program in applications database 108, which is accessible by the issuer's application processing agents. Once an application for a financial transaction account is approved, the account information, which includes information on all supplemental cards associated with the financial transaction account, is stored in accounts database 110.

Figure 6:
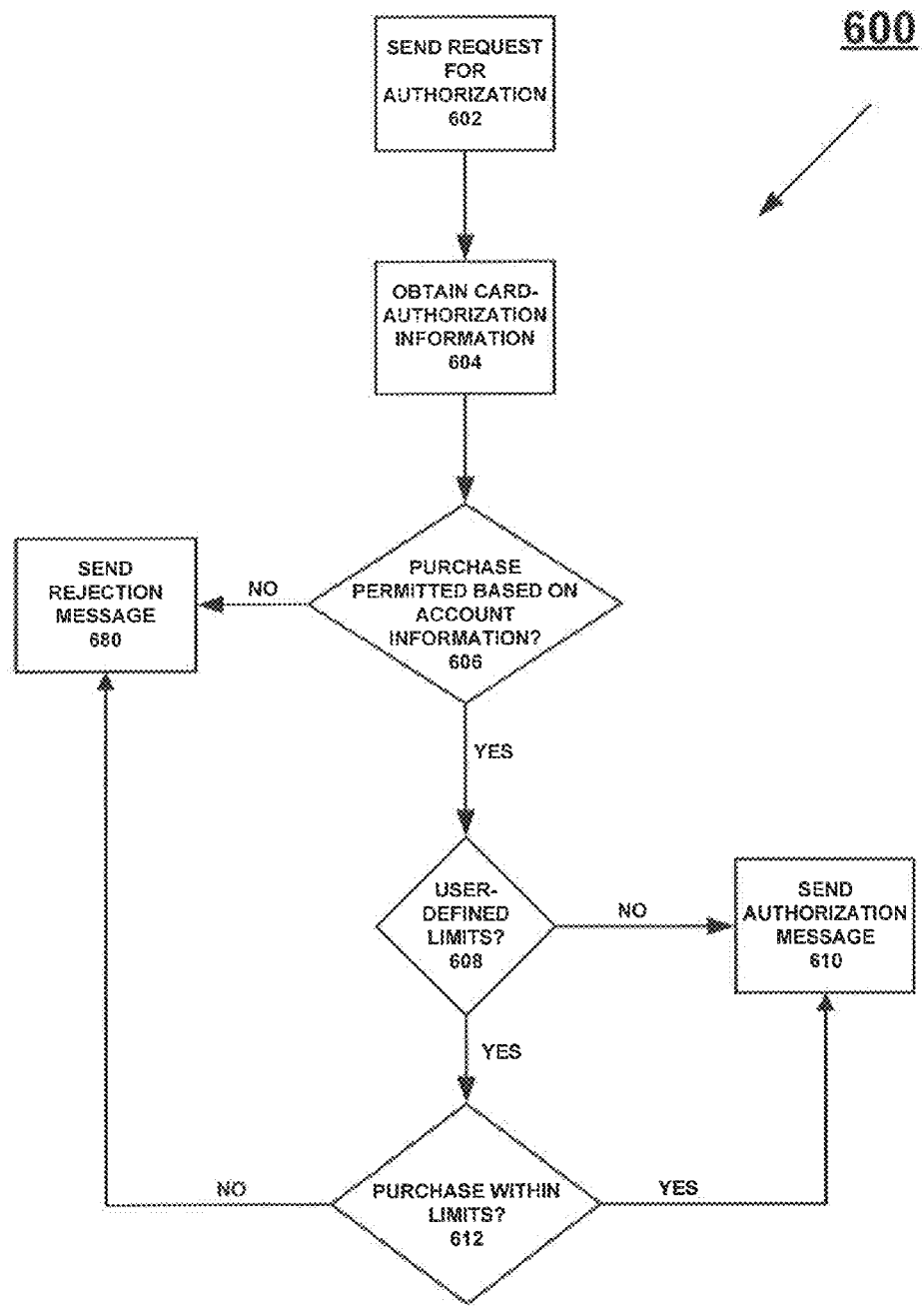
FIG. 6 shows a flowchart illustrating an exemplary authorization process, according to an embodiment of the present invention.

Referring to FIG. 6, a flowchart illustrating an authorization process 600, according to an embodiment of the present invention, is shown. Preferably, process 600 utilizes authorization system 300. As discussed above, optional security measures may be implemented prior to and/or concurrently with communication with server 302.

Process 600 begins at step 602, at which a merchant uses POS device 304 to send a request to server 302 for authorization of a purchase to be paid for using a card. The request provides server 302 with details regarding the purchase, the merchant, and the card, which is read by POS device 304. For example, the details may include information obtained from the card, such as the CID, the cardholder name, the expiration date, etc.; store information, such as a store identification number (which may be useful when a chain of stores have the same name), the location of the store, a department number (which may be useful when the store has more than one department), an employee identification number of the person handling the purchase, an identification number for POS device 304, etc.; and purchase information, such as the date of the purchase, an item identification number for each item to be purchased (which may be used to specifically identify the item and/or to generally identify a descriptive category that the item belongs to), the price and quantity of each item to be purchased, etc. POS device 304 creates an electronic file with the details, and transmits the electronic file to server 302 as part of the request.

At step 604, server 302 determines which financial transaction account corresponds to the card, and accesses database 308 to obtain card-authorization information pertaining to the transaction account. At step 606, server 302 uses the card-authorization information to determine whether the purchase is permitted to be charged to the transaction account. The determination may be made based on factors such as, for example, the unpaid balance in the transaction account, the price of the purchase, the credit limit on the transaction account, and the like.

If the purchase is not permitted, process 600 proceeds to step 680 at which point server 302 transmits a message to POS device 304 rejecting the request for authorization. If the purchase is permitted, process 600 proceeds to step 608.

At step 608, server 302 determines whether user-defined authorization limits have been set for the card by accessing database 308. If no user-defined limits have been set, then server 302 sends an authorization message to POS device 304, at step 610. If user-defined limits have been set, server 302 determines whether the purchase is within the limits, at step 612. If the purchase is not within the limits, then process 600 proceeds to step 680 at which point server 302 transmits a message to POS device 304 rejecting the request for authorization.

If the purchase is permitted to be charged to the transaction account and also is within the user-defined authorization limits, process 600 proceeds to step 610 and server 302 transmits a message to POS device 304 approving the request for authorization.

Figure 5:
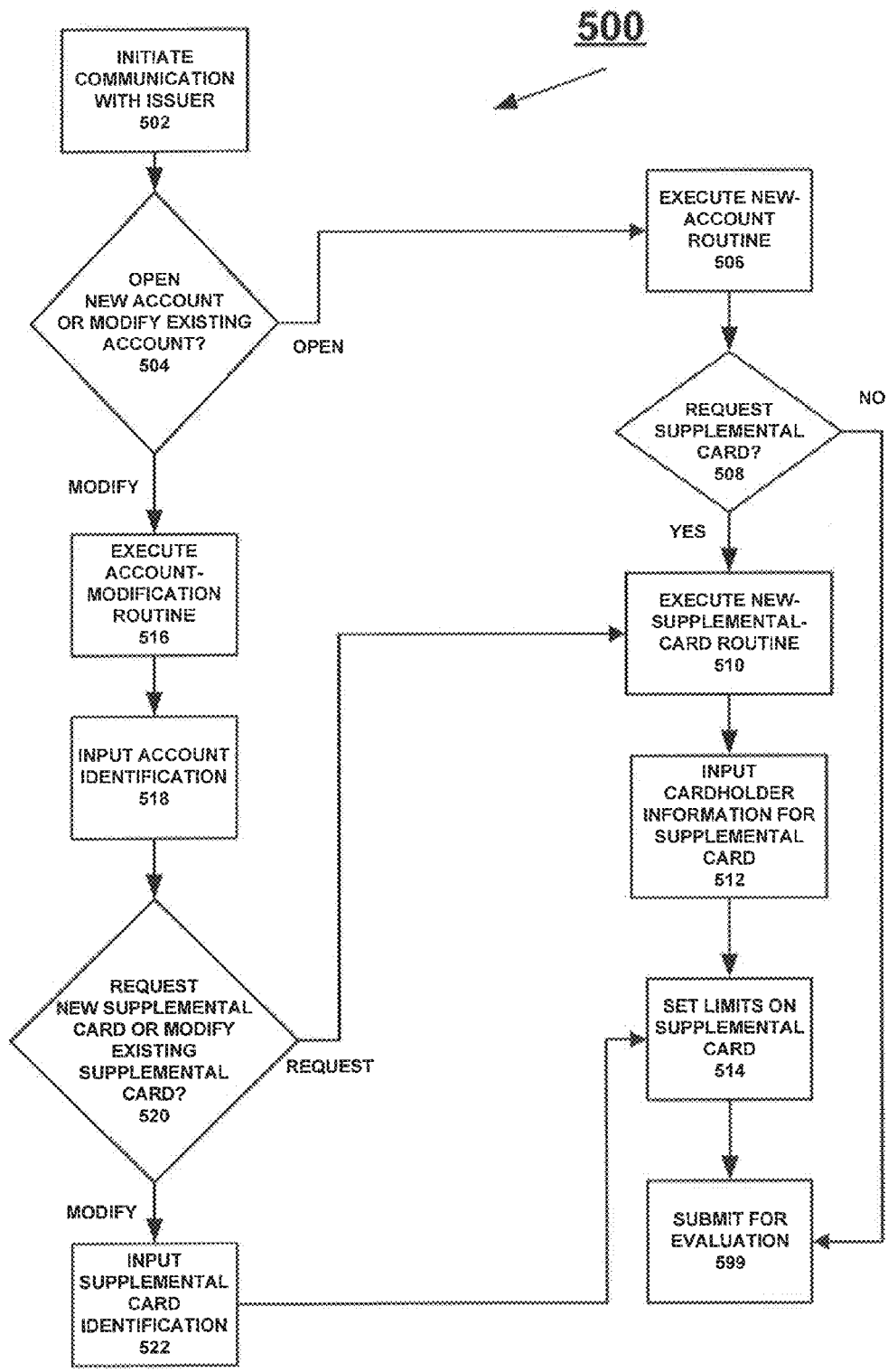
FIG. 5 shows a flowchart illustrating another exemplary authorization-limit definition process, according to an embodiment of the present invention.

As will be appreciated by those of skill in the relevant art(s), the order of steps in process 400, process 500, and process 600 need not be as shown in FIGS. 4, 5, and 6, and some steps may occur in parallel or in another order.

IV. Example Implementation(s)

The present invention (i.e., limit-setting systems 100, 200; authorization system 300; limit-definition processes 400, 500; authorization process 600; or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 7:
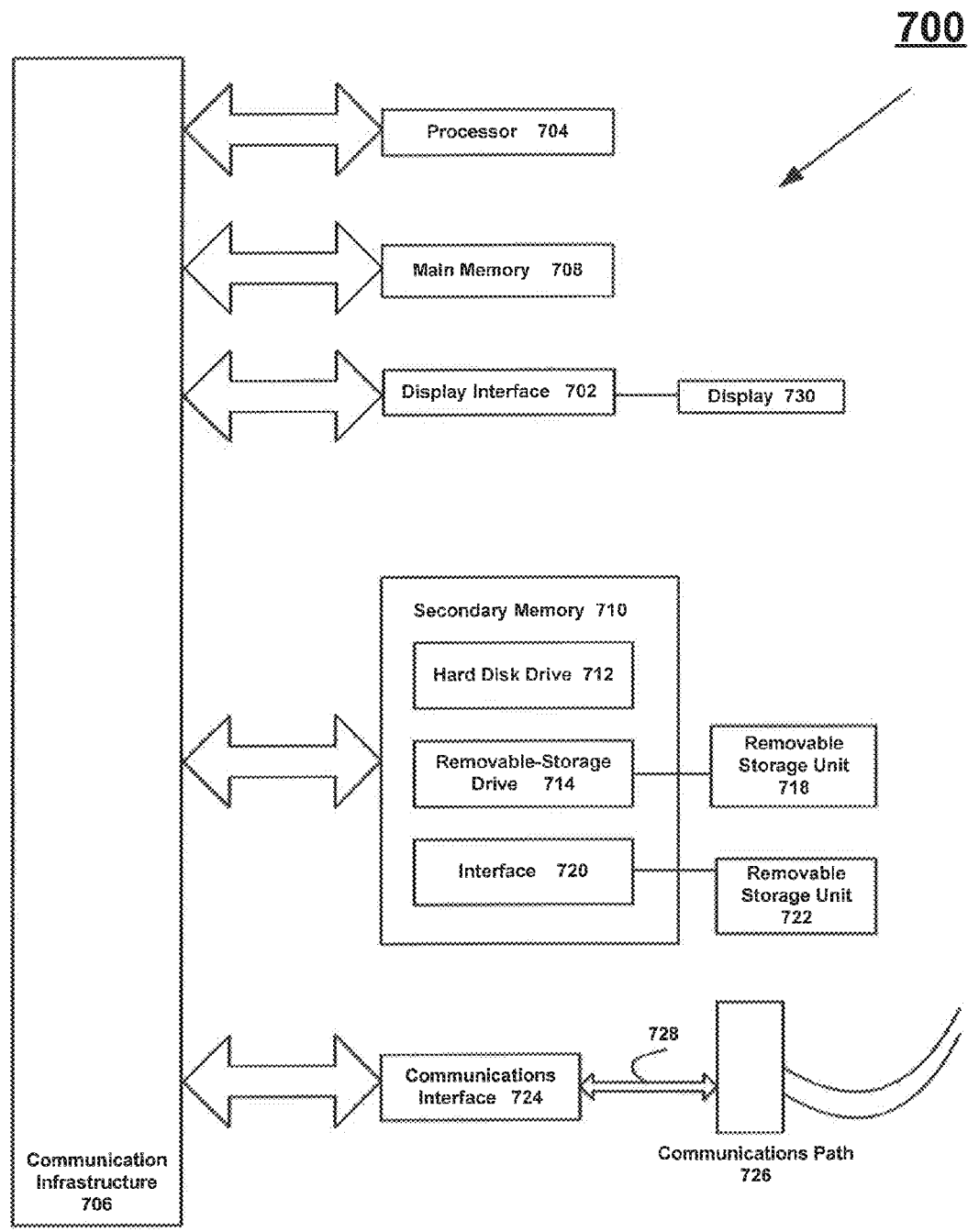
FIG. 7 shows a block diagram of an exemplary computer system useful for implementing an aspect of the present invention.

In fact, in one embodiment, the present invention is directed toward one or more computer systems equipped to carry out the functions described herein. An example of such a computer system 700 is shown in FIG. 7.

Computer system 700 includes at least one processor 704. Processor 704 is connected to a communication infrastructure 706 (e.g., a communications bus, a cross-over bar device, or a network). Although various software embodiments are described herein in terms of this exemplary computer system 700, after reading this description, it will become apparent to a person skilled in the relevant art(s) how to implement the invention using other computer systems and/or architectures.

Computer system 700 includes a display interface 702 that forwards graphics, text, and other data from communication infrastructure 706 (or from a frame buffer (not shown)) for display on a display unit 730.

Computer system 700 also includes a main memory 708, which preferably is a random access memory (RAM), and may also include a secondary memory 710. Secondary memory 710 may include, for example, a hard disk drive 712 and/or a removable-storage drive 714 (e.g., a floppy disk drive, a magnetic tape drive, an optical disk drive, and the like). Removable-storage drive 714 reads from and/or writes to a removable storage unit 718 in a well-known manner. Removable storage unit 718 may be, for example, a floppy disk, a magnetic tape, an optical disk, and the like, which is written to and read by removable-storage drive 714. As will be appreciated, removable storage unit 718 includes a computer-usable storage medium having stored therein computer software and/or data.

In alternative embodiments, secondary memory 710 may include other similar devices for allowing computer programs or other instructions to be loaded into computer system 700. Such devices may include a removable storage unit 722 and an interface 720 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 722 and interfaces 720 that allow software and data to be transferred from removable storage unit 722 to computer system 700.

Computer system 700 may also include a communications interface 724, which allows software and data to be transferred between computer system 700 and external devices (not shown). Examples of communications interface 724 may include a modem, a network interface (e.g., an Ethernet card), a communications port, a Personal Computer Memory Card International Association ("PCMCIA") interface, and the like. Software and data transferred via communications interface 724 are in the form of signals 728, which may be electronic, electromagnetic, optical or another type of signal that is capable of being received by communications interface 724. Signals 728 are provided to communications interface 724 via a communications path 726 (e.g., a channel). Communications path 726 carries signals 728 and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 718 used with removable-storage drive 714, a hard disk installed in hard disk drive 712, and signals 728, for example. These computer program products provide software to computer system 700. The present invention may be implemented or embodied as one or more of such computer program products.

Computer programs (also referred to as computer control logic) are stored in main memory 708 and/or secondary memory 710. The computer programs may also be received via communications interface 724. Such computer programs, when executed, enable computer system 700 to perform the features of the present invention, as discussed herein. In particular, the computer programs, when executed, enable the processor 704 to perform the features of the present invention. Accordingly, such computer programs represent controllers of computer system 700.

In an embodiment where the present invention is implemented using software, the software may be stored in a computer program product and loaded into computer system 700 using removable-storage drive 714, hard drive 712, or communications interface 724. The control logic (software), when executed by processor 704, causes processor 704 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

As will be appreciated by those of skill in the relevant art(s), the present invention may be implemented using a single computer or using a computer system that includes multiple computers each programmed with control logic to perform various of the above-described functions of the present invention.

V. Conclusion

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

The invention claimed is:

1. A method comprising:
  receiving, by a computing device for granting an authorization, a request for the authorization of a transaction involving a transaction account, wherein the request for authorization comprises an employee identification number, an item identification number, an item category and a number of items; and
  determining, by the computing device, whether to grant the request for authorization based on an unpaid balance of the transaction account, a price of the purchase associated with the request for authorization, a credit limit on the transaction account, an item identification number, a forbidden item category, an item category, and an authorization limit stored in the database and corresponding to the transaction account.

2. The method of claim 1, wherein the authorization limits are independently definable for each one of the plurality of financial transaction instruments.

3. The method of claim 1, further comprising verifying that a beneficiary of the transaction account is permitted to set authorization limits on use of the transaction account.

4. The method of claim 1, wherein the authorization limit is at least one of:
  a limit based on merchant type;
  a limit based on merchant name;
  a limit based on a dollar amount; and
  a limit based on merchant location.

5. The method of claim 1, wherein the authorization limit includes user-defined limits.

6. The method of claim 1, wherein the authorization limit includes the forbidden item category.

7. An article of manufacture including a non-transitory, tangible computer readable storage medium having instructions stored thereon that, in response to execution by a computer-based system for granting an authorization, cause the computer-based system to be capable of performing operations comprising:
  receiving, by the computer-based system, a request for the authorization of a transaction involving a transaction account, wherein the request for authorization comprises an employee identification number, an item identification number, an item category and a number of items; and
  determining, by the computer-based system, whether to grant the request for authorization based on an unpaid balance of the transaction account, a price of the purchase associated with the request for authorization, a credit limit on the transaction account, an item identification number, a forbidden item category, an item category, and an authorization limit stored in the database and corresponding to the transaction account.

8. The article of claim 7, further comprising verifying that a beneficiary of the transaction account is permitted to set authorization limits on use of the transaction account.

9. The article of claim 7, wherein the authorization limit is at least one of:
  a limit based on merchant type;
  a limit based on merchant name;
  a limit based on a dollar amount; and
  a limit based on merchant location.

10. The article of claim 7, wherein the authorization limit includes user-defined limits.

11. The article of claim 7, wherein the authorization limit includes the forbidden item category.

12. A system comprising:
  a processor for granting an authorization,
  a tangible, non-transitory memory configured to communicate with the processor,
  the tangible, non-transitory memory having instructions stored thereon that, in response to execution by the processor, cause the processor to be capable of performing operations comprising:
    receiving, by the processor, a request for the authorization of a transaction involving a transaction account, wherein the request for authorization comprises an employee identification number, an item identification number, an item category and a number of items; and determining, by the processor, whether to grant the request for authorization based on an unpaid balance of the transaction account, a price of the purchase associated with the request for authorization, a credit limit on the transaction account, an item identification number, a forbidden item category, an item category, and an authorization limit stored in the database and corresponding to the transaction account.

13. The system of claim 12, wherein the authorization limits are independently definable for each one of the plurality of financial transaction instruments.

14. The system of claim 12, further comprising verifying that a beneficiary of the transaction account is permitted to set authorization limits on use of the transaction account.

15. The system of claim 12, wherein the authorization limit is at least one of:
   a limit based on merchant type;
   a limit based on merchant name;
   a limit based on a dollar amount; and
   a limit based on merchant location.

16. The system of claim 12, wherein the authorization limit includes user-defined limits.

17. The system of claim 12, wherein the authorization limit includes the forbidden item category.

* * * * *